Oct. 26, 1954
H. P. THOMAS
2,692,746
SUPPORTING CLIP
Filed Aug. 6, 1948
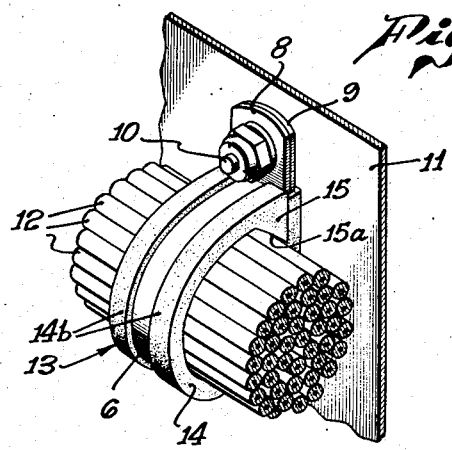
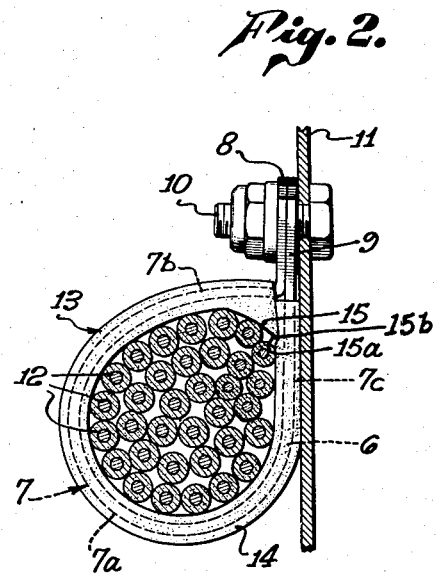
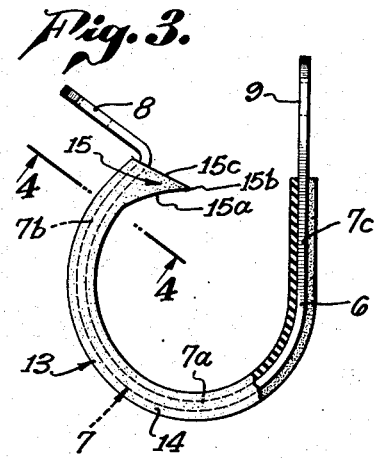
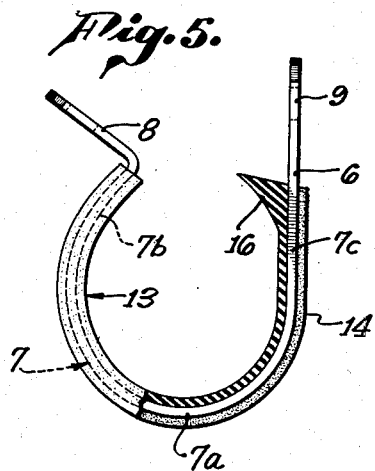
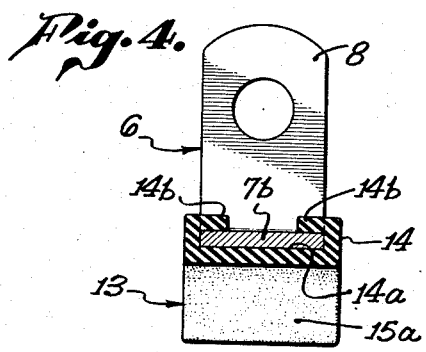
HOWARD P. THOMAS,
INVENTOR.
BY
Paul A. Weilein
ATTORNEY.

Patented Oct. 26, 1954

2,692,746

UNITED STATES PATENT OFFICE 2,692,746

SUPPORTING CLIP

Howard P. Thomas, North Hollywood, Calif., assignor to Thomas Associates, Los Angeles, Calif., a partnership Application August 6, 1948, Serial No. 42,952

6 Claims. (Cl. 248—74)

This invention relates to a supporting clip or hanger; more particularly, it relates to such a clip especially adapted for use with a group or bundle of electric wires.

It is known to provide a clip comprising a metal band or strap in the form of a loop adapted to encompass a group of wires, or a conduit, and having tangential end portions, the outer end part of one of said portions being bent to form an ear adapted to overlie and be secured to the outer end of the other portion with the clip embracing the wires. The means securing the end parts together also serves to attach the clip to a suitable support, so that the wires or conduit are supported thereby. A resilient cushioning lining is provided in the loop to protect the wires or conduit from direct contact and abrasion by the band, which lining terminates substantially at the overlying end parts, thus leaving these parts exposed.

It is an object of this invention to provide an improved clip of this character.

It is another object of this invention to provide a clip of this character having an improved lining to more effectively hold the wires or conduit.

With a clip formed as described, the group of wires or conduit is not gripped effectively for its entire periphery, the clip when tightened tending to distort the bundle or conduit from circular due to the space between the straight portions of the loop. It is accordingly another object of this invention to provide a clip arranged to reduce such distortion when tightened.

Another difficulty with clips of this type is that the end portions of the cushioning lining sometimes fail to meet when the clip is tightened, or if they do meet, the abutting surfaces are of such small area and/or engage with such light pressure, that one or more wires of the bundle may be forced between the ends of the lining. This makes longitudinal adjustment of the wire or wires difficult and is liable to damage the insulation, possibly shorting or grounding the wire.

It is accordingly another object of this invention to provide a clip wherein means are provided to prevent entry of a wire between abutting ends of the lining when the clip is tightened.

It is another object of this invention to provide a clip wherein the cushioning lining is arranged to insure tight contact between the abutting ends thereof when the clip is tightened.

It is still another object of this invention to provide cushioning and insulating lining for clips of the type under discussion which will prevent exposure of the band or strap when clamped to form a loop.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Figure 1 is a perspective view showing a clip incorporating the features of the invention in use;

Figure 2 is an end elevation of the clip as installed in Figure 1;

Figure 3 is an end elevation of the clip of Figure 1 before installation;

Figure 4 is a cross section taken substantially as indicated by line 4—4 of Figure 3; and Figure 5 is an elevation similar to Figure 3 but showing a modified form of the invention.

Referring to Figures 1 to 4, the clip comprises a band 6 of bendable material, such for example as an aluminum alloy of suitable characteristics and gauge, which is bent to form a loop 7 having an intermediate arcuate portion 7-a with straight portions 7-b and 7-c extending tangentially from the opposite ends thereof. One of these straight portions, for example 7-b, is bent outwardly at 90° intermediate its ends to provide an ear 8 adapted to overlie the outer part 9 of the other straight portion 7-c and to be secured thereto as by a bolt or screw 10 extending through suitable apertures in the overlying parts. The bolt 10 also serves to secure the clip to a support 11, which, for example, may be a structural part of an aircraft.

The clip is shown as embracing a group or bundle of electric wires 12. To protect these wires or other elements embraced by the clip, as well as to enable a good frictional grip thereof, the inner surface of the loop 7 is provided with a resilient lining or cushion 13 of natural or synthetic rubber for example. This cushion 13 may be formed as a channel shaped member 14 having a space 14-a for accommodating the strap 6 and inturned opposite edge portions or flanges 14-b for engaging the outer surface thereof. The resilience of the member 14 is such that the member may be readily deformed for placement on the loop 7, and is frictionally retained against movement thereon.

The member 14 is preferably of such length and so placed on the loop 7 that its opposite end portions are in abutting relation when the loop 7 is secured in closed supporting position. Thus, those wires 12 adjacent the overlying ears 8 and 9 are protected from contact with the strap or band 6.

To provide a tight contact between the abutting end portions of the member 14 when the clip is tightened, without the need of accurately forming and placing the member 14, a filler block 15 is formed on one end of the member 14, and is adapted to engage the opposite end portion of the member 14 when the loop 7 is closed. The filler block 15 is of generally triangular form, that surface 15-a thereof adapted to face the inside of the loop being slightly concave and adapted to extend between the tangential portions 7-b and 7-c.

The apex 15-b of the block 15 forms a transversely extending portion adapted to engage and slightly depress the opposite end portion of the member 14 when the clip is tightened, as clearly shown in Figure 2. For this purpose, the block 15 is so proportioned that the portion 15-b projects slightly beyond that end of the member 14 to which the block 15 is attached. Thus, for example, the outer surface 15-c of the triangular block 15 may stand at an obtuse angle with respect to said end of the member 14.

The block 15 may be formed of the same material as the member 14 and integrally therewith, or suitably attached thereto, or it may be formed of different material, such as natural or artificial rubber of a harder grade than the member 14.

The material of the strap 6 is sufficiently yielding to permit the loop 7 to be bent open to receive the wires or other elements to be supported as shown for example in Figure 3, after which the loop 7 is bent to the closed position of Figure 2.

It will be apparent that a block such as 15, will serve its purpose equally well on either end of the member 14. Thus, in Figure 3 it is shown as adjacent the ear 8; in Figure 5 a corresponding block 16 is shown as adjacent the other end. In either case, the block 15 or 16 will engage the opposite end of the lining 13 when the loop 7 is closed, and provide a closed loop with an inclined surface extending between the tangential portions thereof.

I claim:

1. A supporting clip comprising a band formed into a loop adapted to be secured to a support at both overlying ends of said band, one end of said band being bent away from said band to form an ear, a cushion lining overlying the inner surface of said loop, which lining is thickened at one end to form a triangular portion having its outer side in line with the opposite inner end of the cushion lining, said outer side being so constructed and arranged that the outer side of said triangular portion is deflected to conform to the opposite inner surface of said cushion liner.

2. In a supporting clip; a band forming a loop; one end of said band adapted to be secured upon a support; an ear on said band movable to a position to be secured in overlying relation to said one end; a cushion lining on the inner surface of said loop; and a filler block of cushioning material substantially equal in width to that of said lining mounted on said band adjacent said ear; said block having an inner surface facing said loop; said block having an outer surface disposed to be deflected to conform to the inner surface of said lining adjacent the other end of said lining when said ear is secured in overlying relation to said one end of the band.

3. In a supporting clip for a group of wires; a band forming a loop; one end of said band adapted to be secured upon a support; an ear on said band movable to a position to be secured in overlying relation to said one end; a cushion lining the interior of said loop; and a cushion block on said band adjacent said ear; said block having a flexible end portion substantially equal in width to that of the loop; said flexible end portion being disposed to flex against said cushion at a point spaced inwardly from an end of the cushion to close said loop before said ear is positioned to be secured in overlying relation to said one end of said band.

4. In a clip for supporting a bundle of wires; means providing a loop having one end adapted to be secured upon a support; an ear formed on the other end of said loop and being spaced from said one end when said loop is open; said ear being movable to a position overlying said one end to close said loop; a terminating thickened end portion on the inner surface of said loop disposed on one side thereof adjacent the juncture of said loop with said ear, said end portion projecting outwardly away from said ear to overlap the opposite end of said loop providing means when formed into a loop, the outer end surface of said thickened end portion bearing against the opposite end of said loop providing means when formed into a loop.

5. In a clip for supporting a bundle of wires, means providing a loop having one end adapted to be secured upon a support; an ear formed on the other end of said loop and being spaced from said one end when said loop is open; said ear being movable to a position overlying said one end to close said loop; a terminating thickened end portion on the inner surface of said loop disposed on one side thereof adjacent the juncture of said loop with said ear, said end portion being flexible and having surfaces converging in a direction toward said end portion and projecting outwardly away from said ear to overlap the opposite end of said loop providing means when formed into a loop, the outer end surface of said thickened end portion bearing against the opposite end of said loop providing means when formed into a loop.

6. A supporting clip comprising a band formed into a loop adapted to be secured to a support at both overlying ends of said band, one end of said band being bent away from said band to form an ear, a cushion lining overlying the inner surface of said loop, which lining has a portion on the end thereof adjacent said ear providing inner and outer surfaces substantially equal in width to that of the lining; said inner and outer surfaces of said portion extending convergently outward from the adjacent inner surface of the lining to form a flexible end portion disposed to be flexed against the opposite inner surface of the lining to bring said outer surface into contact with said opposite inner surface of said lining.

References Cited in the file of this patent

UNITED STATES PATENTS

| Number | Name | Date |
|---|---|---|
| 470,698 | Murdock | Mar. 15, 1892 |
| 2,340,713 | Tinnerman | Feb. 1, 1944 |
| 2,359,209 | Ellinwood | Sept. 26, 1944 |
| 2,366,041 | Morehouse | Dec. 26, 1944 |
| 2,408,572 | Morehouse | Oct. 1, 1946 |
| 2,455,028 | Tinnerman | Nov. 30, 1948 |
| 2,455,598 | Michalenko | Dec. 7, 1948 |